Figure 1:
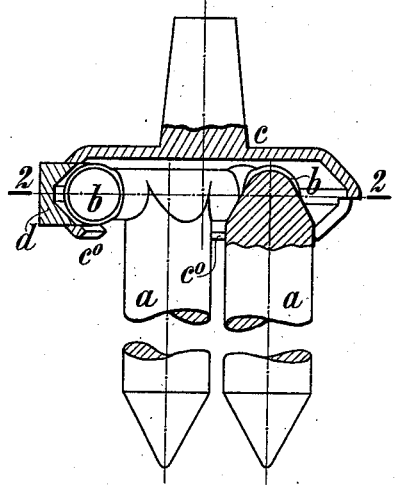

F. MEYER.
TRIPOD WITH HINGED LEGS.
APPLICATION FILED MAR. 31, 1910.

1,000,618.

Patented Aug. 15, 1911.

Witnesses:
Paul Krüger
Richard Haben

Inventor:
Franz Meyer

UNITED STATES PATENT OFFICE.

FRANZ MEYER, OF JENA, GERMANY, ASSIGNOR TO THE FIRM OF CARL ZEISS, OF JENA, GERMANY.

TRIPOD WITH HINGED LEGS.

1,000,618.　　　　　　　Specification of Letters Patent.　　Patented Aug. 15, 1911.

Application filed March 31, 1910. Serial No. 552,687.

*To all whom it may concern:*

Be it known that I, FRANZ MEYER, a citizen of the German Empire, residing at Carl-Zeiss strasse, Jena, in the Grand Duchy of Saxe-Weimar, Germany, have invented a new and useful Tripod with Hinged Legs, of which the following is a specification.

The invention consists in an improvement in tripods in which the three legs are hinged to the head and each leg has two hinge parts arranged on opposite sides with a common axis. A simplified arrangement of this triple hinge connection is here proposed, according to which the head embraces the three pairs of neighboring hinge parts belonging to different legs, each pair from the outside by means of a casing, and a special device is provided for jamming the hinges, after they have been inserted in the head, against each other and the casings.

The three casings must have, in the horizontal plane, such profiles as will counteract the jamming device, that is to say, prevent the three hinges from yielding outward. This object can be attained by a straight profile, so that the two hinges, which have an inclination of 60° to each other, outwardly form with the said profile angles of 60°. It is, however, preferable to reduce these outward angles by employing instead of the straight profile one which is broken in the center of the casing so as to form an angle of less than 180° but not less than 60°. The latter angle is that which the two hinges form with each other, the said outward angles thus becoming equal to zero. When the angular profile is to be replaced by a curved one, an arc having its center in the vertical axis of the tripod head should be preferred, as its production is particularly simple.

Each tripod leg is, as usual, provided at its top with two coaxial hinge surfaces (journal surfaces or bearing surfaces), one on each side of the leg. Carriers of the corresponding counter-surfaces (bearing bodies or journal bodies) may be loosely inserted in the casings, the jamming device pressing them against the latter. In addition thereto, each two bearing or journal bodies, which appertain to hinge parts of two different legs and are arranged in the same casing, abut upon each other under the action of the jamming device, but may also be rigidly connected with each other or made in one piece. Spherical surfaces are suitably provided as hinge surfaces. If journal surfaces are given to the legs as hinge surfaces, between the journals and the casings bearing bodies corresponding to the journals can be wholly dispensed with, that is to say, the legs may be immediately journaled in the casings, though not abutting upon them except in lines. In a similar way the two journals fitted in the same casing may abut upon each other without a common bearing body being inserted between them.

As to the jamming device, it seems that three forms are to be considered, viz., a means for enlarging the distance between two hinge parts joined by the same casing or a means for enlarging the distance between the two hinge surfaces of a leg or, lastly, a means for reducing the distance between the casings.

Figure 3:
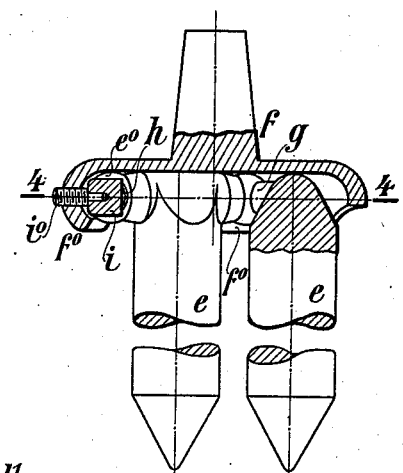
Figures 2, 5:
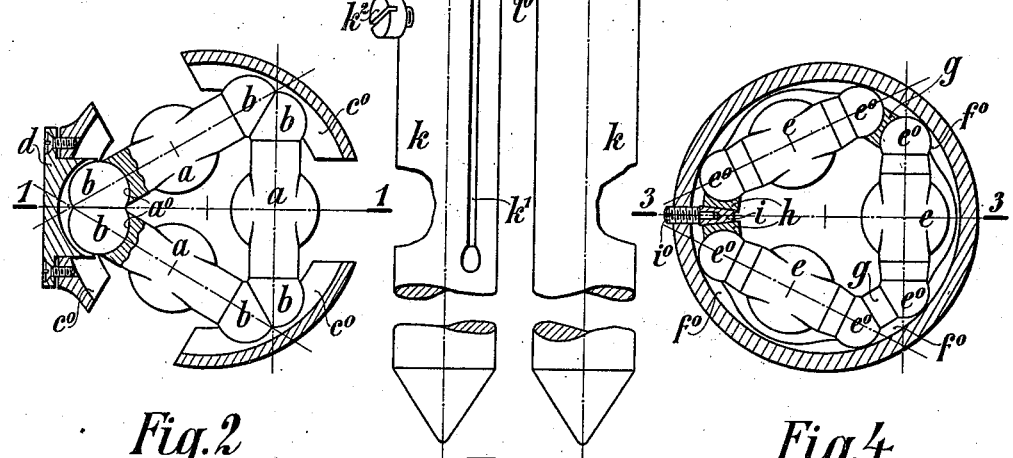
Figure 4:
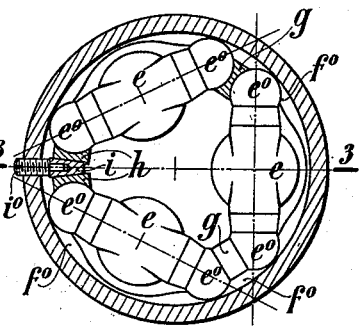
Figure 6:
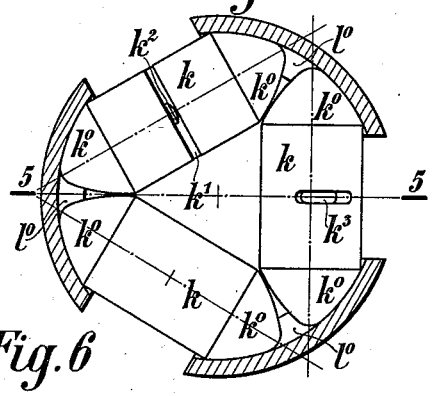

In the annexed drawing: Figure 1 is a vertical section through a tripod, the triple hinge connection of which is constructed according to the invention. Fig. 2 is a horizontal section on line 2—2 in Fig. 1. Fig. 3 is a vertical section through a similar tripod. Fig. 4 is a horizontal section on line 4—4 in Fig. 3. Fig. 5 is a vertical section through a third tripod of the improved kind. Fig. 6 is a horizontal section on line 6—6 in Fig. 5.

In the example according to Figs. 1 and 2, the legs *a* are fitted with bearing surfaces $a^0$ on spherical journal bodies *b*, which may be formed as complete spheres or as shown with plane surfaces, in the latter case either loosely joined or rigidly connected together. For each pair of journal bodies the tripod head *c* is provided with a casing. These three casings, which are indicated by $c^0$, are made integral with the head *c*, so as to form a triple casing, the three parts of which are only separated at the bottom by gaps required for the reception of the three legs, when these are in a widely divergent position. The operative part *d* of one of these casings is adjustable in the radial direction, presenting in this way the device by means of which the three hinges can be jammed against the casings and each other. The inner profile of the three casings in the vertical section along the axis of the head *c* is a truncated right angle. The horizontal inner profile is, in the two casings $c^0$, an arc described from the axis of the head $c$. In the casing $d$, the said profile is more curved to prevent the head $c$ from being rotated over the hinges about its vertical axis.

The example according to Figs. 3 and 4 shows the legs $e$ fitted with spherical journal surfaces $e^0$ immediately within the casings $f^0$ of the head $f$. Between the neighboring journals bearing bodies are arranged, in each of two pairs a common bearing body $g$, in the third pair two single bodies $h$. The latter are placed on both sides of a wedge $i$, which is radially adjustable by means of a screw $i^0$. This device serves to jam the hinges against the casings and each other, and at the same time prevents the head from being rotated about the vertical axis. The three casings $f^0$ have each the same profile, in the horizontal plane an arc described from the vertical axis of the head $f$, in the vertical plane an arc described with the radius of the journal surface $e^0$.

In the last example, Figs. 5 and 6, the legs $k$ are provided with conoid journal surfaces $k^0$, whose line of profile is adapted to the arc corresponding to which the three casings $l^0$ of the head $l$ are profiled in the plane of the hinge axes, and which arc has again its center in the vertical axis of the head. The vertical profile of the casings is derived from the circle that forms the base line of the journal surfaces $k^0$, so that a portion of this base line is in contact with the casing. The jamming device is arranged in one leg and comprises the slit $k^1$ and the thrust screw $k^2$. In addition thereto, in another leg a groove $k^3$ is provided, which together with a screwed pin $l^1$ fixed in the head $l$ prevents this head from being rotated in the horizontal plane relatively to the other parts of the tripod.

I claim:

1. In a tripod a head, three legs, each leg having two hinge parts arranged on opposite sides with a common axis and the head comprising three casings adapted to embrace from the outside the three pairs of neighboring hinge parts, and a device for jamming the hinges.

2. In a tripod a head, three legs, each leg having two hinge parts arranged on opposite sides with a common axis and the head comprising three casings adapted to embrace from the outside the three pairs of neighboring hinge parts, independent hinge parts adapted to and inserted between the said neighboring parts, and a device for jamming the hinges.

3. In a tripod a head, three legs, each leg having two hinge parts arranged on opposite sides with a common axis and the head comprising three casings adapted to embrace from the outside the three pairs of neighboring hinge parts, independent hinge parts adapted to and inserted between the said neighboring parts, and a wedge device arranged in one of the casings and adapted to increase the distance between two of the neighboring hinge parts which are embraced by the said casing.

FRANZ MEYER.

Witnesses:
PAUL KRÜGER,
ALFRED MACKEDANZ.

Copies of this patent may be obtained for five cents each, by addressing the "Commissioner of Patents, Washington, D. C."